US012719997B2

(12) United States Patent
Hashimoto et al.

(10) Patent No.: US 12,719,997 B2
(45) Date of Patent: Aug. 25, 2026

(54) IMAGE READING APPARATUS, INFORMATION PROCESSING METHOD, AND NON-TRANSITORY RECORDING MEDIUM FOR EDITING PAGE DATA OF A MULTI-PAGE DOCUMENT IN EXTERNAL STORAGE

(71) Applicant: PFU LIMITED, Ishikawa (JP)

(72) Inventors: Yuta Hashimoto, Ishikawa (JP); Mitsuhiro Yashiki, Ishikawa (JP)

(73) Assignee: PFU Limited, Ishikawa (JP)

( * ) Notice: Subject to any disclaimer, the term of this patent is extended or adjusted under 35 U.S.C. 154(b) by 0 days.

(21) Appl. No.: 18/434,442

(22) Filed: Feb. 6, 2024

(65) Prior Publication Data

US 2024/0275900 A1 Aug. 15, 2024

(30) Foreign Application Priority Data

Feb. 14, 2023 (JP) ................................ 2023-020541

(51) Int. Cl.
*H04N 1/32* (2006.01)

(52) U.S. Cl.
CPC ..... *H04N 1/32368* (2013.01); *H04N 1/32128* (2013.01); *H04N 1/32464* (2013.01); *H04N 2201/3242* (2013.01); *H04N 2201/3295* (2013.01)

(58) Field of Classification Search
CPC ........... H04N 1/32368; H04N 1/32464; H04N 2201/3295; H04N 1/32128; H04N 2201/3242
See application file for complete search history.

(56) References Cited

U.S. PATENT DOCUMENTS

| | | | | |
|---|---|---|---|---|
| 6,292,273 B1 | 9/2001 | Dow et al. | | |
| 6,771,383 B1 * | 8/2004 | Ogaki | H04N 1/32464 | 358/1.15 |
| 8,937,742 B2 * | 1/2015 | Okamoto | H04N 1/00408 | 358/452 |

(Continued)

FOREIGN PATENT DOCUMENTS

| | | |
|---|---|---|
| JP | 2000-148591 A | 5/2000 |
| JP | 2001-352404 A | 12/2001 |
| JP | 2009-124316 A | 6/2009 |

*Primary Examiner* — Nicholas Pachol
(74) *Attorney, Agent, or Firm* — RIMON P.C.

(57) ABSTRACT

An information processing apparatus includes circuitry to receive, from a reading unit that reads a document having multiple pages, multiple page data individually corresponding to the multiple pages of the document; and transmit, to an external storage, the multiple page data to be stored in the external storage. The circuitry starts the transmitting, to an external storage, the multiple page data to be stored in the external storage before reading all pages of the document completes. The circuitry receives an edit instruction for editing page data transmitted to the external storage among the multiple page data; and transmits, to the external storage, edit data for reflecting the edit instruction in a content to be displayed based on the multiple page data read from the external storage, so as to cause the external storage to execute processing corresponding to the edit instruction for editing the page data having been transmitted.

20 Claims, 10 Drawing Sheets

(56) References Cited

U.S. PATENT DOCUMENTS

| | | | | |
|---|---|---|---|---|
| 2004/0184069 | A1* | 9/2004 | Mifune | G06K 15/00 358/1.15 |
| 2005/0073711 | A1* | 4/2005 | Dokuni | H04N 1/32101 358/1.14 |
| 2009/0122336 | A1 | 5/2009 | Honma | |
| 2011/0069357 | A1* | 3/2011 | Austin | H04N 1/00811 358/474 |
| 2011/0228351 | A1* | 9/2011 | Uchida | H04N 1/387 358/474 |
| 2014/0313533 | A1* | 10/2014 | Nishioka | H04N 1/00411 358/1.13 |
| 2015/0160895 | A1* | 6/2015 | Mizuno | G06F 3/1256 358/1.15 |
| 2021/0058522 | A1* | 2/2021 | Dagate | H04N 1/00214 |
| 2022/0070323 | A1* | 3/2022 | Tokuda | H04N 1/00737 |
| 2023/0016418 | A1* | 1/2023 | Hotta | H04N 1/346 |
| 2023/0205465 | A1* | 6/2023 | Onoguchi | G06F 3/1205 358/1.15 |
| 2023/0247150 | A1* | 8/2023 | Fujinaga | H04N 1/00458 358/1.18 |

* cited by examiner

MULTI-PAGE FILE

HEADER

FIRST PAGE
PAGE DATA

SECOND PAGE
PAGE DATA

.
.
.

FOOTER
(INCLUDING PAGE INFORMATION ON INDIVIDUAL PAGES)

FIG. 5

| PAGE NUMBER | FILE NAME |
|---|---|
| 1 | 20220705_001.jpg |
| 2 | 20220705_002.jpg |
| 3 | 20220705_003.jpg |
| 4 | 20220705_004.jpg |
| 5 | 20220705_005.jpg |

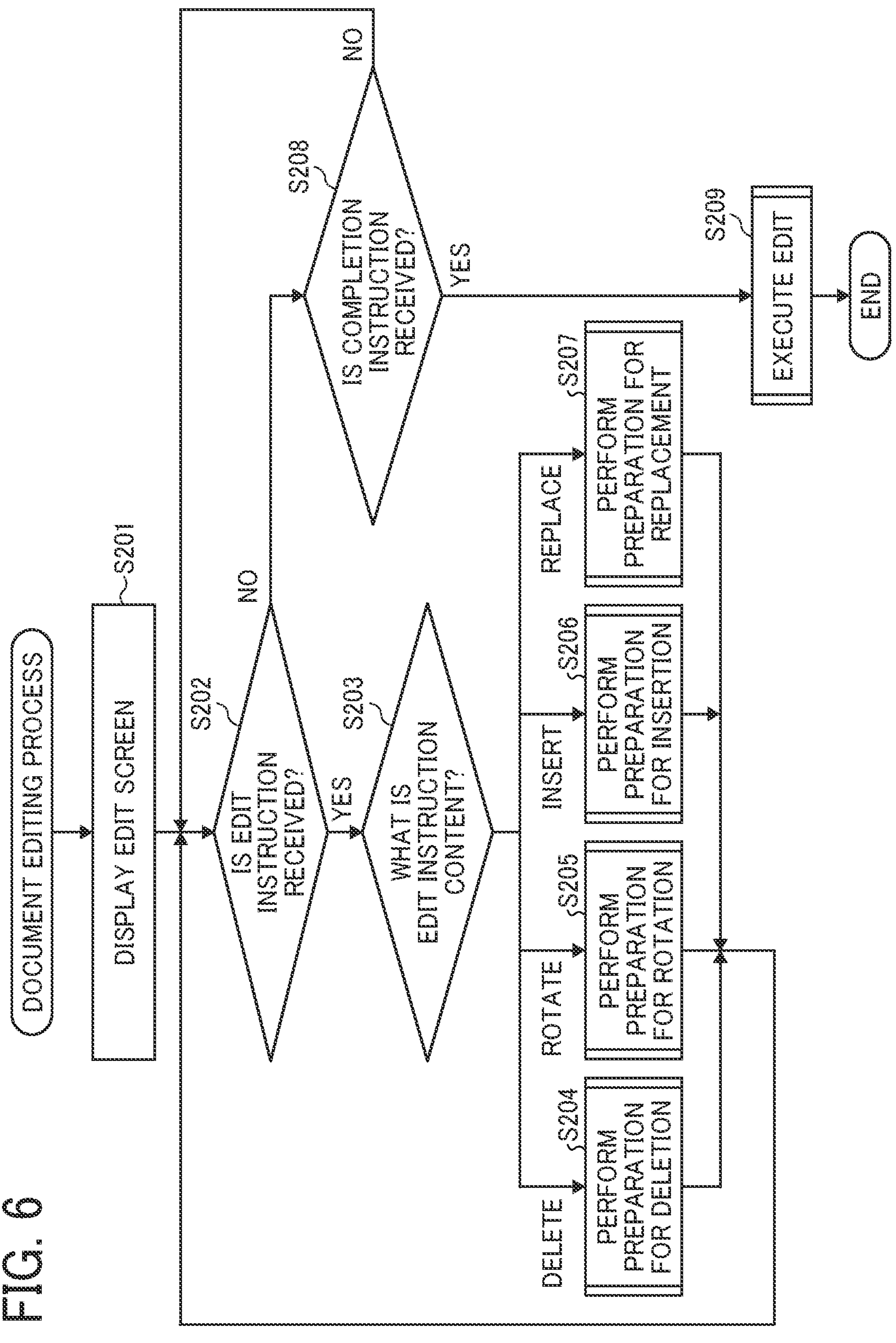
FIG. 6
DOCUMENT EDITING PROCESS
DISPLAY EDIT SCREEN
S201
IS EDIT INSTRUCTION RECEIVED?
S202
YES
NO
WHAT IS EDIT INSTRUCTION CONTENT?
S203
DELETE
ROTATE
INSERT
REPLACE
PERFORM PREPARATION FOR DELETION
S204
PERFORM PREPARATION FOR ROTATION
S205
PERFORM PREPARATION FOR INSERTION
S206
PERFORM PREPARATION FOR REPLACEMENT
S207
IS COMPLETION INSTRUCTION RECEIVED?
S208
YES
NO
EXECUTE EDIT
S209
END

IMAGE READING APPARATUS, INFORMATION PROCESSING METHOD, AND NON-TRANSITORY RECORDING MEDIUM FOR EDITING PAGE DATA OF A MULTI-PAGE DOCUMENT IN EXTERNAL STORAGE

CROSS-REFERENCE TO RELATED APPLICATIONS

This patent application is based on and claims priority pursuant to 35 U.S.C. § 119(a) to Japanese Patent Application No. 2023-020541, filed on Feb. 14, 2023, in the Japan Patent Office, the entire disclosure of which is hereby incorporated by reference herein.

BACKGROUND

Technical Field

Embodiments of the present disclosure relate to an information processing apparatus, an information processing method, and a non-transitory recording medium.

Related Art

In the related art, various techniques have been proposed for editing data of a document read by a reading device or a scanner.

SUMMARY

In one aspect, an information processing apparatus includes circuitry to receive, from a reading unit that reads a document having multiple pages, multiple page data individually corresponding to the multiple pages of the document; and transmit, to an external storage external to the information processing apparatus, the multiple page data to be stored in the external storage. The circuitry starts the transmission, to the external storage, of the multiple page data before reading all pages of the document completes. Further, the circuitry receives an edit instruction for editing page data having been transmitted to the external storage among the multiple page data; and transmits, to the external storage, edit data for reflecting the edit instruction in a content to be displayed based on the multiple page data read from the external storage, so as to cause the external storage to execute processing corresponding to the edit instruction for editing the page data having been transmitted.

In another aspect, an information processing method includes receiving, with an information processing apparatus, from a reading unit that reads a document having multiple pages, multiple page data individually corresponding to the multiple pages of the document; and transmitting, to an external storage external to the information processing apparatus, the multiple page data to be stored in the external storage. The transmitting is started before reading all pages of the document completes. The method further includes receiving an edit instruction for editing page data having been transmitted to the external storage among the multiple page data; and transmitting, to the external storage, edit data for reflecting the edit instruction in a content to be displayed based on the multiple page data read from the external storage, so as to cause the external storage to execute processing corresponding to the edit instruction for editing the page data having been transmitted.

In another aspect, a non-transitory recording medium stores a plurality of program codes which, when executed by a computer of an information processing apparatus, causes the computer to perform the method described above.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 5 is a diagram illustrating correspondence data (read list) according to an embodiment of the present disclosure;

FIG. 6 is a flowchart of a document editing process according to an embodiment of the present disclosure;

Figure 1:
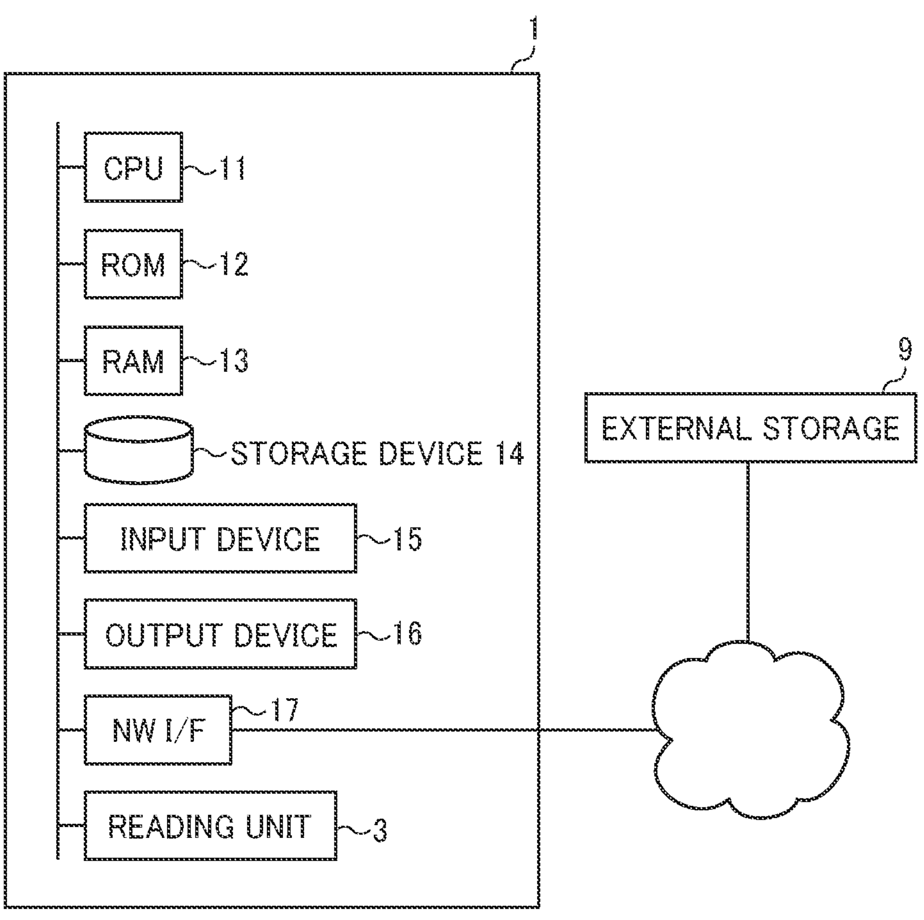
FIG. 1 is a schematic diagram illustrating a configuration of a system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, an information processing apparatus, an information processing system, a method, and a program according to embodiments of the present disclosure are described below, with reference to the drawings. As used herein, the singular forms “a,” “an,” and “the” are intended to include the plural forms as well, unless the context clearly indicates otherwise.

The embodiments described below are illustrative, and the information processing apparatus, the information processing system, the method, and the program according to the present disclosure are not limited to the specific configurations described below. In the implementation, a specific configuration may be adopted according to the mode of implementation, and various improvements and modifications may be made.

In the present embodiment described below, the information processing apparatus, the information processing system, the method, and the program according to some aspects of the present disclosure are applied to a system that stores and manages, in an external storage, document data obtained by a scanner. However, the information processing apparatus, the information processing system, the method, and the program according to embodiments of the present disclosure can be widely applicable to editing a read document, and what the present disclosure is applied is not limited to those described below.

The efficiency of document management has been enhanced by scanners that can convert paper documents to electronic data. Some scanners have the function of displaying read images as thumbnails for confirmation. However, even in such scanners, the reading must be performed again from the beginning when an unnecessary page is mixed in or when the direction of a page is wrong. In addition, the efficiency of document management may be lowered by, for example, unnecessary data remaining in the external storage or a display of an unnecessary page in the browsing of the document.

Some scanners can automatically store a file of a read document in an external storage connected via a network. Such scanners generate a file name in accordance with a predetermined naming convention and store a file of read electronic data in the external storage. However, when multiple users store read data in one external storage using one or multiple scanners, the files of the users are mixed in one shared folder. Then, it is difficult for the users to find desired files in the shared folder. Further, when the file transmitted to the external storage is a multi-page file, an editing tool is used to delete or edit a particular page, which takes time and effort. In systems known in the art for transmitting data of a read document to an external storage, opportunities for editing the document are limited to an opportunity to edit the document by the scanner before the document is transmitted to the external storage and an opportunity to edit the document by retrieving, with the scanner, the document from the external storage after the document is transmitted thereto.

In view of the foregoing, the system according to the present embodiment has the functions of deleting unnecessary document data from the external storage, preventing the unnecessary document data from being displayed, and allowing the user to edit the read document without accessing the external storage, to enhance the efficiency of document management. However, it is not necessary to solve all the inconveniences described above by adopting all the configurations described below in the implementation of the technology according to the present disclosure. In other words, in the implementation of the technology according to the present disclosure, a part of the above-described inconveniences may be solved by adopting a part of the configurations described below.

System Configuration

FIG. 1 is a schematic diagram illustrating a configuration of a system according to the present embodiment. In the system according to the present embodiment, a scanner 1 (an information processing apparatus) is connected to an external storage 9 such as a cloud server, a file server, or an online storage via a network or other communication means to communicate with each other. In the present embodiment, the technology according to the present disclosure is applied to a so-called network scanner in which one housing includes a reading unit and has a communication function. However, the system according to the present embodiment may be any system including an information processing apparatus connected to a reading unit that can read a document having multiple pages. For example, the technology according to the present disclosure is applicable to a system in which a scanner including a reading unit is connected, via a network or a communication means such as a peripheral device interface, to an information processing apparatus having a communication function with an external storage.

The scanner 1 is a computer (i.e., an information processing apparatus) including a reading unit 3, a central processing unit (CPU) 11, a read-only memory (ROM) 12, a random-access memory (RAM) 13, a storage device 14 such as an electrically erasable programmable read-only memory (EEPROM) or a hard disk drive (HDD), an input device 15 such as a keyboard, a mouse, or a touch panel, an output device 16 such as a display, and a network interface (I/F) 17 serving as a communication unit. Regarding the specific hardware configuration of the scanner 1, some components may be omitted, replaced, or added as appropriate according to the mode of implementation. Further, the scanner 1 is not necessarily an apparatus having a single housing. The scanner 1 (the information processing apparatus connected to a reading unit) may be implemented by multiple apparatuses using, for example, a so-called cloud computing or distributed computing technology.

[Shape Generation Process]

The reading unit 3 is a device that captures an image of a document placed on the scanner by a user, to obtain image data. Examples of the document include a text document, a business card, a receipt, a photograph, and an illustration. In the present embodiment, the reading unit 3, which is a so-called scanner with a sheet feeder, is exemplified as a device for obtaining an image of a target (e.g., a document). However, the device for acquiring an image is not limited to a so-called scanner. For example, an image of a target may be captured by a digital camera, or a camera sensor built in a smartphone or tablet, to obtain an image.

The scanner 1 according to the present embodiment has the function of transmitting image data, obtained by image capture, to the external storage 9 through a network. The scanner 1 may further include a user interface, such as a touch panel display and a keyboard, for inputting and outputting characters and selecting a desired item. The scanner 8 may further have a web browsing function and a server function. The communication means, the hardware configuration, and other configurations of the scanner that adopts the method according to the present embodiment are not limited to the illustrative examples described in the present embodiment.

Figures 2, 3:
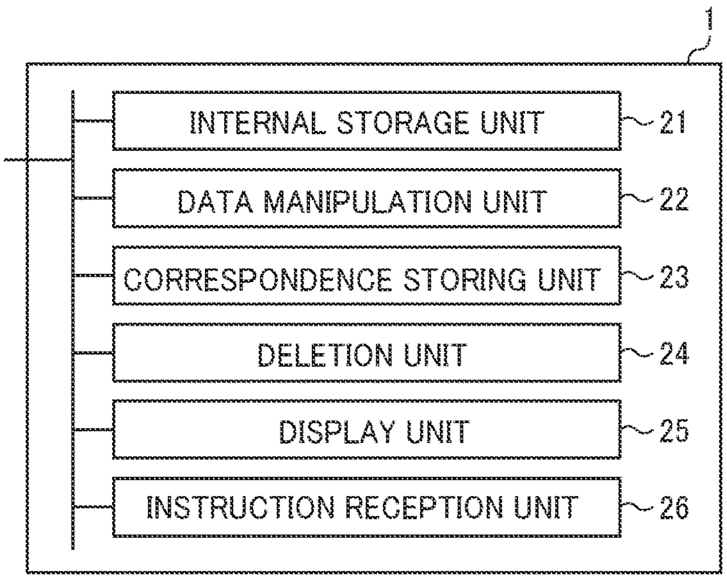
FIG. 2 is a schematic diagram illustrating a functional configuration of an information processing apparatus according to an embodiment of the present disclosure.
FIG. 3 is a diagram illustrating a structure of a multi-page file according to an embodiment of the present disclosure.

FIG. 2 is a schematic diagram illustrating a functional configuration of the scanner 1 according to the present embodiment. In the scanner 1, the CPU 11 executes a program loaded onto the RAM 13 from the storage device 14, to control the hardware components included in the scanner 1. Then, the scanner 1 functions as an information processing apparatus including an internal storage unit 21 (an internal memory), a data manipulation unit 22, a correspondence storing unit 23, a deletion unit 24, a display unit 25, and an instruction reception unit 26. In other words, such hardware resources function as the information processing apparatus connected to a reading unit.

In the present embodiment and other embodiments described below, the functions of the scanner 1 are executed by the CPU 11 which is a general-purpose processor. Alternatively, a part or all of these functions may be executed by one or multiple dedicated processors.

The internal storage unit 21 stores the page data of the page read by the reading unit 3 in the RAM 13 and/or the storage device 14 of the scanner 1. In other words, the RAM 13 and/or the storage device 14 serves as the internal storage unit 21.

The data manipulation unit 22 transmits multiple pieces of page data individually corresponding to the pages of the document to the external storage 9 to be stored in the external storage 9. In the present embodiment, the external storage 9 is described as an online storage. The term "page data" in the present embodiment refers to data for displaying the corresponding page. In the present embodiment, page data includes image data. However, page data is not limited to image data including so-called pixel information but may be any data for displaying the content included in the page read by the reading unit 3.

Page data may be, for example, data for displaying contents in the page based on data including, for example, character codes obtained by optical character recognition (OCR), outlined drawing information, and ruled line information (i.e., drawing data not based on pixel information).

In the present embodiment, the data manipulation unit 22 starts transmitting the multiple page data to the external storage 9 before the reading of all pages of the document completes. In the present embodiment, the multiple pieces of page data individually corresponding to the pages are transmitted in the order of reading, but the order of transmission is not limited to the order of reading. Further, the data manipulation unit 22 transmits, to the external storage 9, edit data for reflecting the content of an edit instruction in the content displayed based on the multiple page data read from the external storage 9. By so doing, the data manipulation unit 22 causes the external storage 9 to execute the processing corresponding to the edit instruction for editing the transmitted page data. In other words, the edit data includes the command instructing the external storage 9 to execute the processing corresponding to the edit instruction.

In the system according to the present embodiment, the method of storing page data of a document to the external storage 9 is selectable according to a user setting from storing page data as one file per document and storing page data as one file per page. In the following description, a file stored per document may be referred to as a "multi-page file," and a file stored per page may be referred to as a "single-page file." In the following description, storing page data of a document in the external storage 9 as one file (multi-page file) per document may be referred to as "multi-page storing," and storing page data of a document in the external storage 9 as one file (single-page file) per page is referred to as "single-page storing." The data manipulation unit 22 determines the edit data for reflecting the content of the edit instruction depending on whether the storing setting is the multi-page storing or the single-page storing. The edit data includes identification information of a page related to the edit instruction. The identification information of a single-page file is the file identifier. The identification information of a multi-page file are the file identifier and the page identifier.

In the present embodiment, a unit of contents that the user wants to manage as a group is handled as a "document." Accordingly, in the present embodiment, when two or more documents are combined into one document, the combined document is handled as one new document. When the multi-page storing is selected in the above-described storing setting, one document is handled as one multi-page file. By contrast, when the single-page storing is selected in the storing setting, one document is handled as single-page files equal in number as the pages included in the document.

Accordingly, when the storing setting is the single-page storing, the edit data transmitted by the data manipulation unit 22 includes identification information identifying the file corresponding to the page related to the edit instruction. When the storing setting is the multi-page storing, the edit data transmitted by the data manipulation unit 22 to the external storage 9 includes identification information identifying the file corresponding to the page related to the edit instruction and the page related to the edit instruction. The edit data may include, in addition to or in alternative to such identification information, page display information that is related to the file and generated according to the edit instruction. By transmitting such edit data, the data manipulation unit 22 causes the external storage 9 to execute the processing corresponding to the edit instruction.

FIG. 3 is a diagram illustrating a structure of a multi-page file according to the present embodiment. In the present embodiment, a portable document format (PDF) file is used as the multi-page file. The PDF can manage one document having multiple pages as one file, and the file has a header, page data of an individual page, and a footer in order from the top. The footer includes information of individual pages. An information processing apparatus that displays a PDF file refers to the page information to determine, for example, whether to display or hide and the sequence in the display of individual pages included in the PDF file. However, the file format adoptable for multi-page files is not limited to PDF.

Similarly, when the storing setting is the single-page storing, the file format adoptable for single-page files is not limited. Examples of the file format for single-page files include Joint Photographic Experts Group (JPEG), Portable Network Graphics (PNG), and PDF.

The correspondence storing unit 23 stores correspondence data (a read list storing data identifiers) indicating the correspondence between page data or the document transmitted to the external storage 9 and the file stored in the external storage 9. The correspondence data is stored in, for example, the RAM 13 or the storage device 14. The data manipulation unit 22 described above designates the file to be edited based on the correspondence data.

The deletion unit 24 deletes the page data transmitted to the external storage 9 from the internal storage unit 21 before the reading of all pages of the document completes. The timing of the deletion is not limited, but the deletion unit 24 deletes the page data transmitted to the external storage 9 timely to prevent the shortage of the storable area of the internal storage unit 21 in the reading by the reading unit 3.

The display unit 25 displays the thumbnails of the pages included in the document. The display unit 25 generates thumbnail data based on the page data read by the reading unit 3 and stored in the internal storage unit 21, and outputs the thumbnail data to a display device such as a touch panel display of the scanner 1 as the thumbnail for presenting an outline of the target page.

The instruction reception unit 26 receives an edit instruction related to the page data. In the present embodiment, the instruction reception unit 26 can receive an edit instruction related to not only the unsent page data not yet transmitted to the external storage 9 but also the page data that has been transmitted to the external storage 9 among the multiple page data corresponding to the displayed thumbnails. Further, the instruction reception unit 26 according to the present embodiment can receive an edit instruction related to page data that has been transmitted to the external storage 9 even after the page data affected by the edit instruction is deleted from the internal storage unit 21. At this time, the instruction reception unit 26 allows the user to select a thumbnail, to receive the page to be edited, and allows the user to press an edit instruction button displayed with the thumbnail, to receive the edit instruction. In the present embodiment, the options of the edit instruction include a page deletion instruction, a page rotation instruction, a page insertion instruction, and a page replacement instruction. A page insertion instruction is an instruction for inserting, at a predetermined position, a page of the document supplementarily read by the reading unit 3. The page replacement instruction is an instruction for replacing two pages in a document with each other.

Operation Flow

A description is given below of a process executed by the scanner 1 according to the present embodiment. The specific content and the order of processing described below are examples for implementing the present disclosure. The specific processing content and the order of processing may be appropriately selected according to the mode of implementation of the present disclosure.

Figure 4:
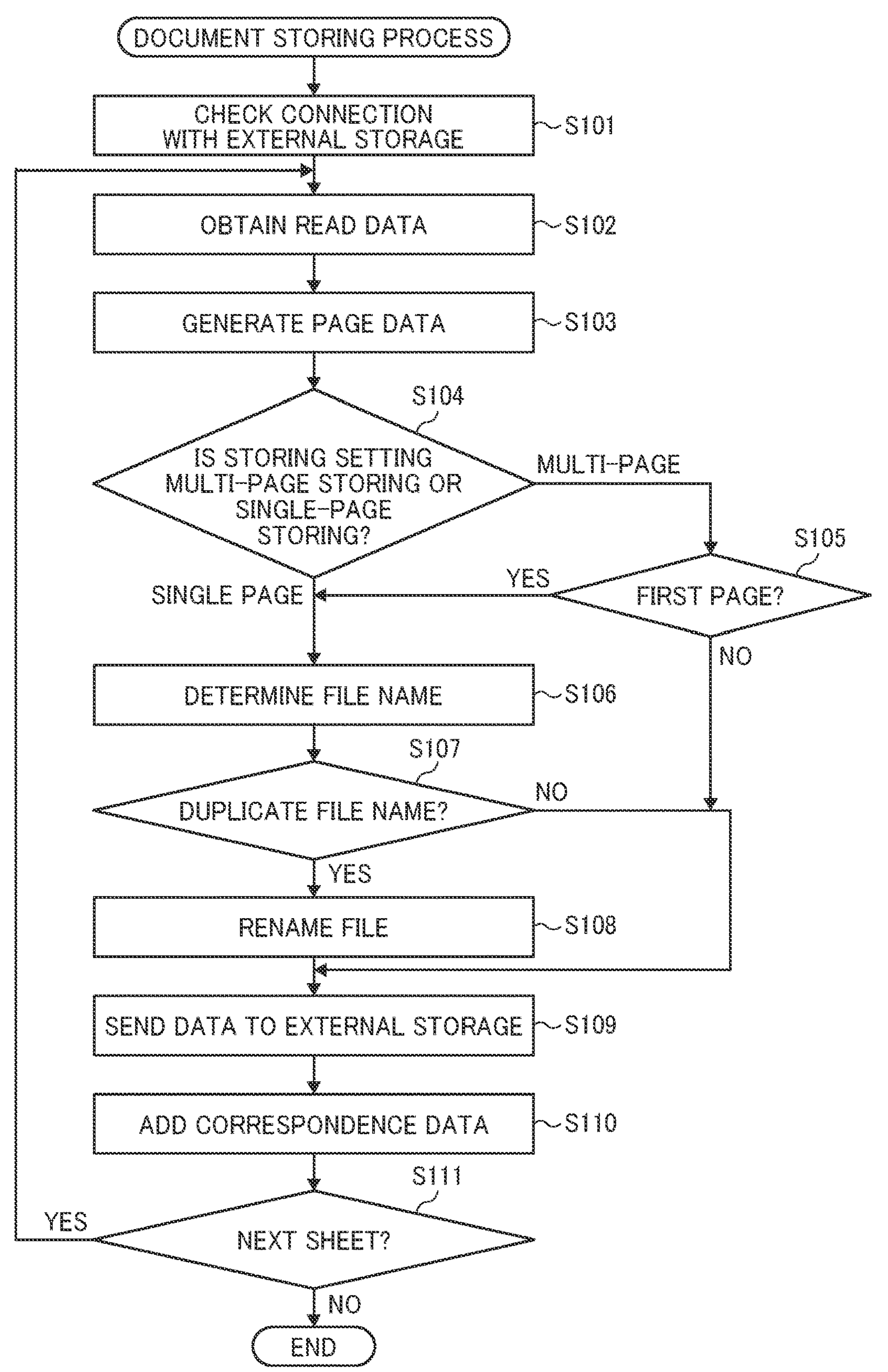
FIG. 4 is a schematic flowchart of a document storing process according to an embodiment of the present disclosure.

FIG. 4 is a flowchart schematically illustrating a document storing process according to the present embodiment. The process illustrated in the flowchart is executed in response to the receiving by the scanner 1 of an instruction for starting the reading from a user.

In steps S101 to S103, page data of the pages included in the document is generated. When the instruction to start reading from the user is received, the data manipulation unit 22 checks the connection with external storage 9 (step S101), and the reading unit 3 starts reading the document placed in the sheet feeder. In the present embodiment, the reading unit 3 captures, one page at a time, images of the document placed in the sheet feeder while conveying the document. By so doing, the reading unit 3 obtains read data for each page. When the read data for one page is obtained from the reading unit 3 (step S102), the data manipulation unit 22 generates page data for that page based on the read data (step S103) and stores the page data in the internal storage unit 21. In the present embodiment, the page data includes image data of the corresponding page. The process then proceeds to step S104.

In step S104, the data manipulation unit 22 checks the storing setting. The data manipulation unit 22 refers to the setting data of the scanner 1 and checks whether the storing setting is the multi-page storing or the single-page storing. When the storing setting is the multi-page storing, the process proceeds to step S105. By contrast, when the storing setting is the single-page storing, the process proceeds to step S106.

In step S105, the data manipulation unit 22 determines whether the page data is of the first page of the document. When the storing setting is the multi-page storing, the data manipulation unit 22 determines whether the read page data corresponds to the first page of the document placed in the sheet feeder. This determination can be made by referring to the counter obtained from the reading unit 3. When the read page data corresponds to the first page of the document placed on the sheet feeders, the process proceeds to step S106. By contrast, when the read page data corresponds to the second or subsequent page of the document placed on the sheet feeder, the process proceeds to step S109.

In steps S106 to S108, the file name is determined. When the storing setting is the multi-page storing and the read page data corresponds to the first page of the document placed in the sheet feeder, or when the storing setting is the single-page storing, the data manipulation unit 22 determines the file name based on a preset naming convention (step S106). The file name may include, for example, at least one of date and time information related to the reading, apparatus information related to the reading, user information related to the reading, and text information in the page. The text information in the page can be obtained by performing optical character recognition (OCR) on the page data of the first page, and the data manipulation unit 22 can use, as the file name, a character string, inferred to be the title of the document, in the obtained text information. When the date and time information related to the reading is used, for example, the file of a document read at 9:00 on Aug. 13, 2020, can include "202008130900" in its file name. Further, in the case of single-page storing, the page number of that page in the document including that page is added (for example, as "_001") to the end of the file name. In other words, when the storing setting is the single-page storing, one file is generated per page, and the file is given a file name in the format such as "(document name)_(page number)."

Further, the data manipulation unit 22 inquires of the external storage 9 whether a file having the same name is already in the folder of the external storage 9 to which the currently generated file is to be transmitted, by designating the folder path, thereby checking whether the file name is duplicate (step S107). When the file name is duplicated, the data manipulation unit 22 renames the file name of the file to be transmitted (step S108). Specifically, in the present embodiment, the file is renamed by adding a serial number (for example, "_001") to the end of the file name to avoid duplication, but other rules may be adopted for the file renaming convention. The process then proceeds to step S109.

In step S109, the data of the document is transmitted (sent) to the external storage 9.

When the file name is determined, the data manipulation unit 22 reads the page data generated in step S103 from the internal storage unit 21 and transmits the page data to the external storage 9 (step S109). Specifically, in the case where the storing setting is the multi-page storing, when transmitting the page data of for the first page, the data manipulation unit 22 transmits the header of the file in addition to the page data of the first page. When transmitting the second and subsequent page data, the data manipulation unit 22 transmits the page data of the corresponding page. When the storing setting is the single-page storing, the data manipulation unit 22 transmits the entire file including the page data of the corresponding page. The page data transmitted to the external storage 9 is deleted from the internal storage unit 21 by the deletion unit 24 as appropriate. The process then proceeds to step S110.

In step S110, a record of the transmitted page data is added to the correspondence data. The correspondence storing unit 23 stores the correspondence data includes data identifiers, as the correspondence data indicating the correspondence between the page data or document transmitted to the external storage 9 in step S109 and the file stored in the external storage 9.

FIG. 5 is a diagram illustrating correspondence data (read list) according to the present embodiment. FIG. 5 illustrates an example of the correspondence data in the single-page storing, and the correspondence between the page number of the page included in the read document and the file name of the file including the corresponding page data is stored. The correspondence data stored in the multi-page storing indicates the correspondence between the read document and the file name of the file including the page data of the document. When the data is added to the correspondence data, the process proceeds to step S111.

In step S111, whether to repeat the process is determined depending on the presence of a next sheet. The scanner 1 checks whether a next sheet is in the sheet feeder. When there is a next sheet, the process returns to step S102. In other words, in the present embodiment, when a document having multiple pages is placed in the sheet feeder and the reading is started, the process from step S102 to step S111 is executed every time one page is read. When it is determined that there is no next sheet in the sheet feeder, the process in the flowchart of FIG. 4 completes. As can be understood from the above description, in the case of single-page storing, at the time when all the sheets placed in the sheet feeder are read and the process up to step S111 completes, the files for the individual pages are generated in the external storage 9. By contrast, in the case of multi-page storing, at the time when all the sheets placed in the sheet feeder are read and the process up to step S111 completes, the header of the file and the page data of the individual pages are stored in the external storage 9, but the generation of the multi-page file is not completed.

FIG. 6 is a flowchart of a document editing process according to the present embodiment. The process in the flowchart of FIG. 6 is executed in response to the completion of the document storing process described with reference to FIG. 4. However, the document storing process and the document editing process may be executed in parallel partially. For example, the document editing process may be started in the middle of the document storing process (for example, when the generation of the thumbnail of the read page completes).

In steps S201 to S203, an edit screen is displayed, and an edit operation by the user is received. When the reading completes, the display unit 25 displays an edit screen including a thumbnail of the read page data on the touch panel display mounted on the scanner 1 (step S201), and prompts the user to confirm the reading result (i.e., the scanning result). The instruction reception unit 26 receives an operation by the user via the edit screen displayed on the touch panel display.

Figure 7:
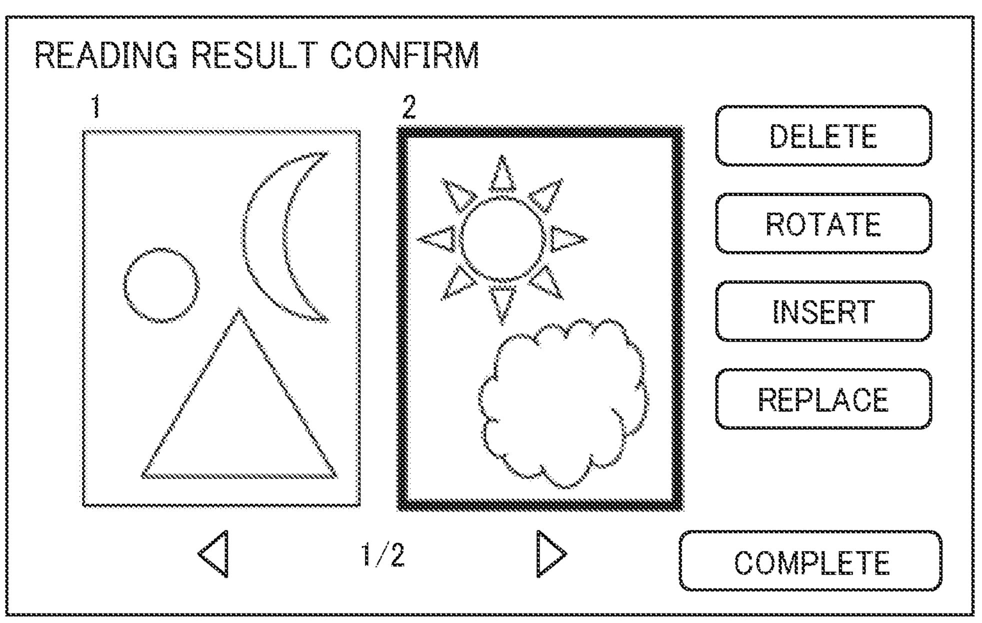
FIG. 7 is a diagram illustrating an edit screen according to an embodiment of the present disclosure.

FIG. 7 is a diagram illustrating an edit screen according to the present embodiment. The edit screen displays the thumbnails of the pages included in the read document and operation elements "delete," "rotate," "insert," "replace," and "complete." The user can select a thumbnail displayed on the edit screen and operate one of the operation elements "delete," "rotate," "insert," and "replace," to issue an edit instruction (a page deletion instruction, a page rotation instruction, a page insertion instruction, or a page replacement instruction) of the designated page. In the present embodiment, the operation elements are button images displayed on the touch panel display. The user can complete the editing operation by operating the operation element "complete" on the edit screen. In the present embodiment, the operation element is a button image on the touch panel display.

For example, when determining that the fifth page of the read document is unnecessary, the user touches the thumbnail image of the fifth page on the edit screen displayed on the touch panel display, to select the thumbnail image. At this time, the selected thumbnail image may be highlighted by, for example, a thick surrounding line as illustrated in FIG. 7, an animation, or masking with a color such as gray. The user can designate the selected page to be deleted (may be referred to as "deletion target page" in the following description) by pressing the "delete" button.

When the edit instruction including the designation of the page to be edited and the edit content is received (YES in step S202), the data manipulation unit 22 determines the content of the received edit instruction (step S203). The process then proceeds to step S204.

In steps S204 to S208, a preparatory process corresponding to the content of the edit instruction is executed. When the edit instruction received in step S203 is a page deletion instruction, the preparation for deletion is performed (step S204). When the received edit instruction is a page rotation instruction, the preparation for rotation is performed (step S205). When the received edit instruction is a page insertion instruction, the preparation for insertion is performed (step S206). When the received edit instruction is a page replacement instruction, the preparation for replacement is performed (step S207). The details of these processes will be described later with reference to other flowcharts. The process then returns to step S202.

When no edit instruction is received in step S202 (NO in step S202), the data manipulation unit 22 determines whether a completion instruction (in the present embodiment, pressing the "complete" button) is received (step S208). When the data manipulation unit 22 determines that a completion instruction has not been received, the process returns to step S202. In other words, in the process illustrated in the flowchart of FIG. 6, the process from step S202 to step S208 is repeated until the completion instruction is received. By contrast, when the data manipulation unit 22 determines that a completion instruction is received, the process proceeds to step S209.

In step S209, the editing prepared by the preparatory process is executed. The details of the process of execution of edit will be described later with reference to other flowcharts. Then, the process illustrated in the flowchart of FIG. 6 ends.

Figure 8:
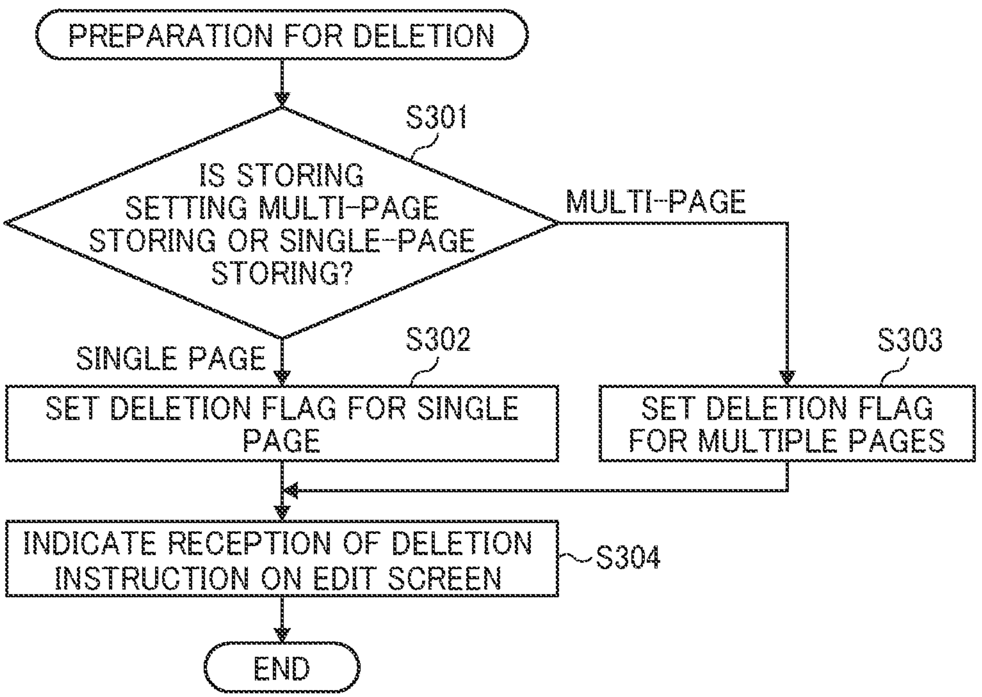
FIG. 8 is a flowchart of a preparatory process for deletion according to an embodiment of the present disclosure.

FIG. 8 is a flowchart of the preparatory process for deletion according to the present embodiment. The process illustrated in the flowchart of FIG. 8 corresponds to step S204 of the document editing process described with reference to FIG. 6.

In step S301, the storing setting is checked. The data manipulation unit 22 refers to the setting data of the scanner 1 and checks whether the storing setting is the multi-page storing or the single-page storing. When the storing setting is the multi-page storing, the process proceeds to step S303. By contrast, when the storing setting is the single-page storing, the process proceeds to step S302.

In step S302, a single-page file deletion flag is set. When the storing setting is the single-page storing, the data manipulation unit 22 sets, in the correspondence data, the single-page file deletion flag for the file that has been transmitted to the external storage 9 and corresponds to the page designated to be deleted (i.e., the deletion target page). In the following description, the terms "transmitted file" and "transmitted page data" refer to those having been transmitted to the external storage 9 unless otherwise specified. The single-page file deletion flag is a flag for transmitting a deletion command for deleting the file of the deletion target page and a rename command for changing the page numbers assigned to the file names of the files of the pages subsequent to the deletion target page in the process of execution of edit described later. The process then proceeds to step S304.

In step S303, a multi-page file deletion flag is set. When the storing setting is the multi-page storing, the data manipulation unit 22 sets, in the correspondence data, the multi-page file deletion flag for the transmitted page data that corresponds to the deletion target page. The multi-page file deletion flag is a flag for generating multi-page file footer data for setting a deletion target page to be hidden in the process of execution of edit described below. The process then proceeds to step S304.

In step S304, an indication that the deletion instruction has been received is displayed. The display unit 25 adds, on the edit screen on the display, the indication of the reception of the deletion instruction to the thumbnail of the page designated to be deleted, among the thumbnails displayed on the edit screen. Thus, the edit screen is updated. The indication is, for example, a mark indicating deletion or a change in color tone of the deletion target thumbnail. Then, the process illustrated in the flowchart of FIG. 8 ends.

Figure 9:
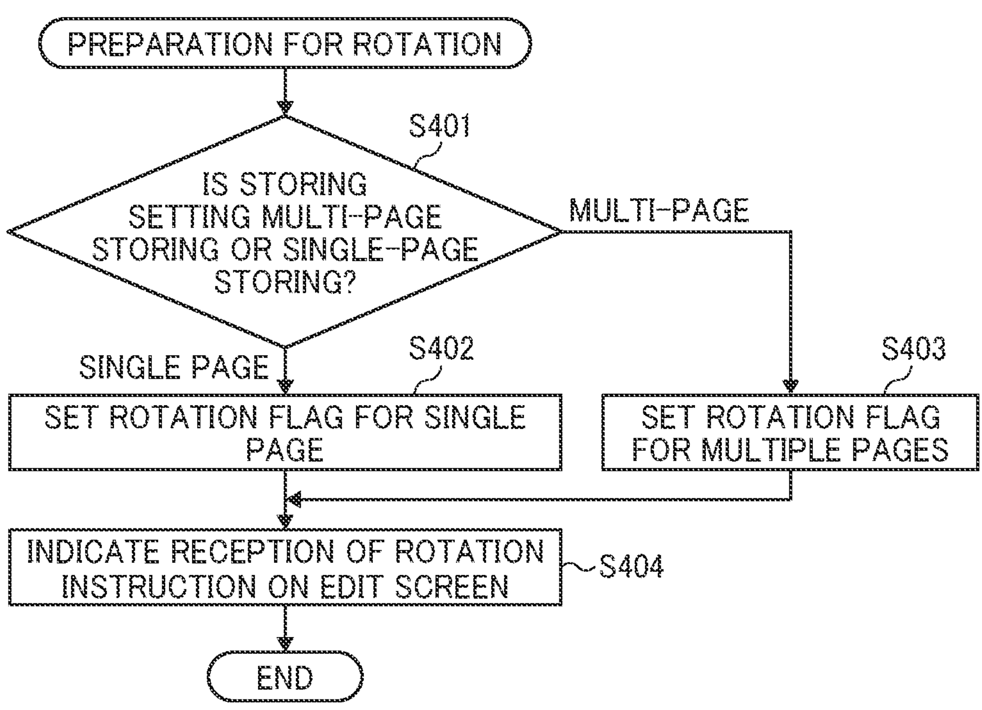
FIG. 9 is a flowchart of a preparatory process for rotation according to an embodiment of the present disclosure.

FIG. 9 is a flowchart of the preparatory process for rotation according to the present embodiment. The process illustrated in the flowchart of FIG. 9 corresponds to step S205 of the document editing process described with reference to FIG. 6.

In step S401, the storing setting is checked. The data manipulation unit 22 refers to the setting data of the scanner 1 and checks whether the storing setting is the multi-page storing or the single-page storing. When the storing setting is the multi-page storing, the process proceeds to step S403. By contrast, when the storing setting is the single-page storing, the process proceeds to step S402.

In step S402, a single-page file rotation flag is set. When the storing setting is the single-page storing, the data manipulation unit 22 sets, in the correspondence data, the single-page file rotation flag for the transmitted file that corresponds to the page designated to be rotated (may be referred to as the rotation target page in the following description). The single-page file rotation flag is a flag for acquiring the file of the rotation target page from the external storage 9 and rotating the page, to generate a file including the rotated page data in the process of execution of edit described later, and for transmitting the file including the rotated page data to the external storage 9. The process then proceeds to step S404.

In step S403, a multi-page file rotation flag is set. When the storing setting is the multi-page storing, the data manipulation unit 22 sets, in the correspondence data, the multi-page file rotation flag for the transmitted page data that corresponds to the rotation target page. The multi-page file rotation flag is a flag for acquiring the page data corresponding to the rotation target page from the external storage 9 and generating rotated page data in the process of execution of edit described later and for transmitting the rotated page data to the external storage 9. The process then proceeds to step S404.

In step S404, an indication that the rotation instruction has been received is displayed. The display unit 25 adds, on the edit screen on the display, the indication that the rotation instruction has been received to the thumbnail of the page designated to be rotated, among the thumbnails displayed on the edit screen. Thus, the edit screen is updated. The indication is, for example, a mark indicating rotation or a thumbnail in the rotated orientation. Then, the process illustrated in the flowchart of FIG. 9 ends.

Figure 10:
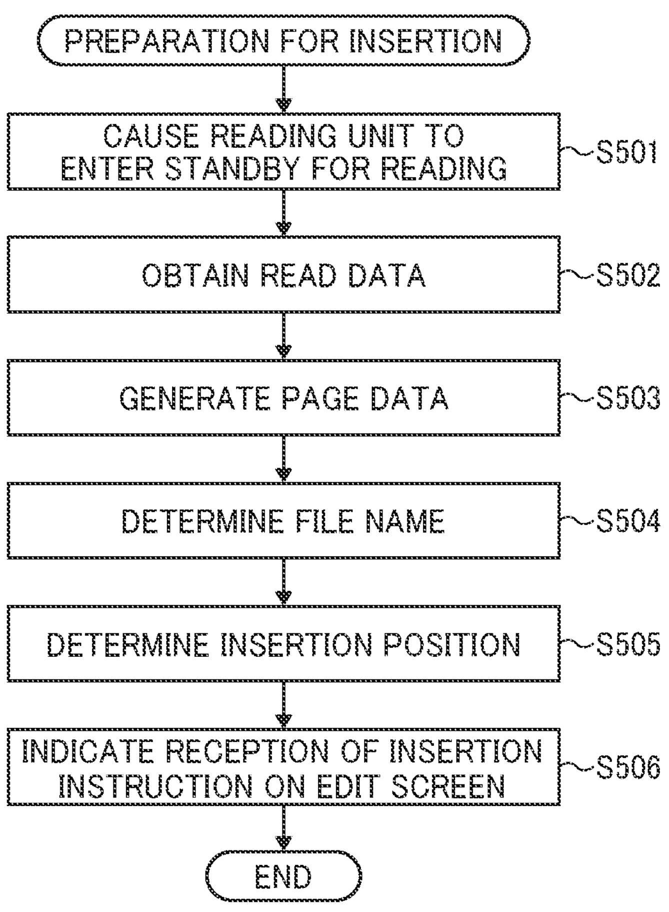
FIG. 10 is a flowchart of a preparatory process for insertion according to an embodiment of the present disclosure.

FIG. 10 is a flowchart of the preparatory process for insertion according to the present embodiment.

The process illustrated in the flowchart of FIG. 10 corresponds to step S206 of the document editing process described with reference to FIG. 6.

In steps S501 to S503, the page data of the page to be inserted (may be referred to as the inserted page or supplemental page in the following description) is generated. The data manipulation unit 22 causes the reading unit 3 to enter standby for reading (step S501). The display unit 25 presents a "start scan" button on the touch panel display of the scanner unit 1, and the instruction reception unit 26 waits for the user to place the sheet to be inserted and press the "start scan" button. When pressing of the "start scan" button by the user is received, the reading unit 3 starts reading the page placed on the sheet feeder by the user, to be inserted. When the read data of the inserted page is obtained from the reading unit 3 (step S502), the data manipulation unit 22 generates the page data of the inserted page based on the read data (step S503). The process then proceeds to step S504.

In step S504, the file name of the inserted page is determined. In the case of single-page storing, the data manipulation unit 22 determines the file name of the inserted page with reference to the correspondence data. As described above, the page number (for example, "_001") of that page in the document including that page is added to the end of the file name. However, the file name of the inserted page is temporarily given a page number which does not overlap any page currently included in the document. The page number temporarily given is, for example, the page number of "the final page number+1." For example, when 10 pages have been read and one page additionally read is inserted, the file name is given the page number "11." The process then proceeds to step S505.

In step S505, the insertion position is determined. The instruction reception unit 26 inquires of the user between which pages the inserted page is to be inserted on the edit screen, and the data manipulation unit 22 determines the insertion position according to the instruction from the user. The user may be allowed to select a thumbnail to designate the position immediately preceding or subsequent to the selected thumbnail as the insertion position of the inserted page. Alternatively, the user may be allowed to select or input a page number to designate the position immediately preceding or subsequent to the selected or input page number as the insertion position.

The process then proceeds to step S506.

In step S506, an indication that the insertion instruction has been received is displayed. The display unit 25 displays the thumbnail of the inserted page between the thumbnails of the pages designated as the insertion positions among the thumbnails on the edit screen. The display unit 25 adds, on the edit screen on the display, an indication of the insertion target (for example, a mark indicating the insertion target) to the thumbnail of the inserted page. Then, the process illustrated in the flowchart of FIG. 10 ends.

Figure 11:
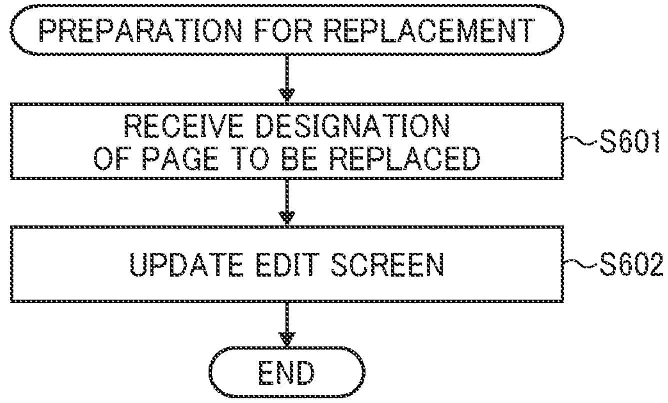
FIG. 11 is a flowchart of a preparatory process for replacement according to an embodiment of the present disclosure.

FIG. 11 is a flowchart of the preparatory process for replacement according to the present embodiment.

The process illustrated in the flowchart of FIG. 11 corresponds to step S207 of the document editing process described with reference to FIG. 6.

In step S601, the designation of pages to be replaced (may be referred to as the replacement target pages in the following description) is received. The first replacement target page is the page designated to be edited by the user in step S202 of the document editing process described with reference to FIG. 6, but two replacement target pages need to be selected. Accordingly, in S601, the designation of the second replacement target page is received.

The instruction reception unit 26 inquires of the user which page is to be the second replacement target page on the edit screen, and the data manipulation unit 22 determines the second replacement target page according to the instruction from the user. The user may be allowed to select a thumbnail of the page, to determine the page corresponding to the thumbnail as the replacement target page. The process then proceeds to step S602.

In step S602, an indication that the replacement instruction has been received is displayed. The display unit 25 adds, on the edit screen on the display, indications of the replacement targets to the thumbnails of the two pages designated to be replaced, among the thumbnails. The indications are, for example, marks indicating the replacement targets or a display of the thumbnails in the changed order. Then, the process illustrated in the flowchart of FIG. 11 ends.

Figure 12:
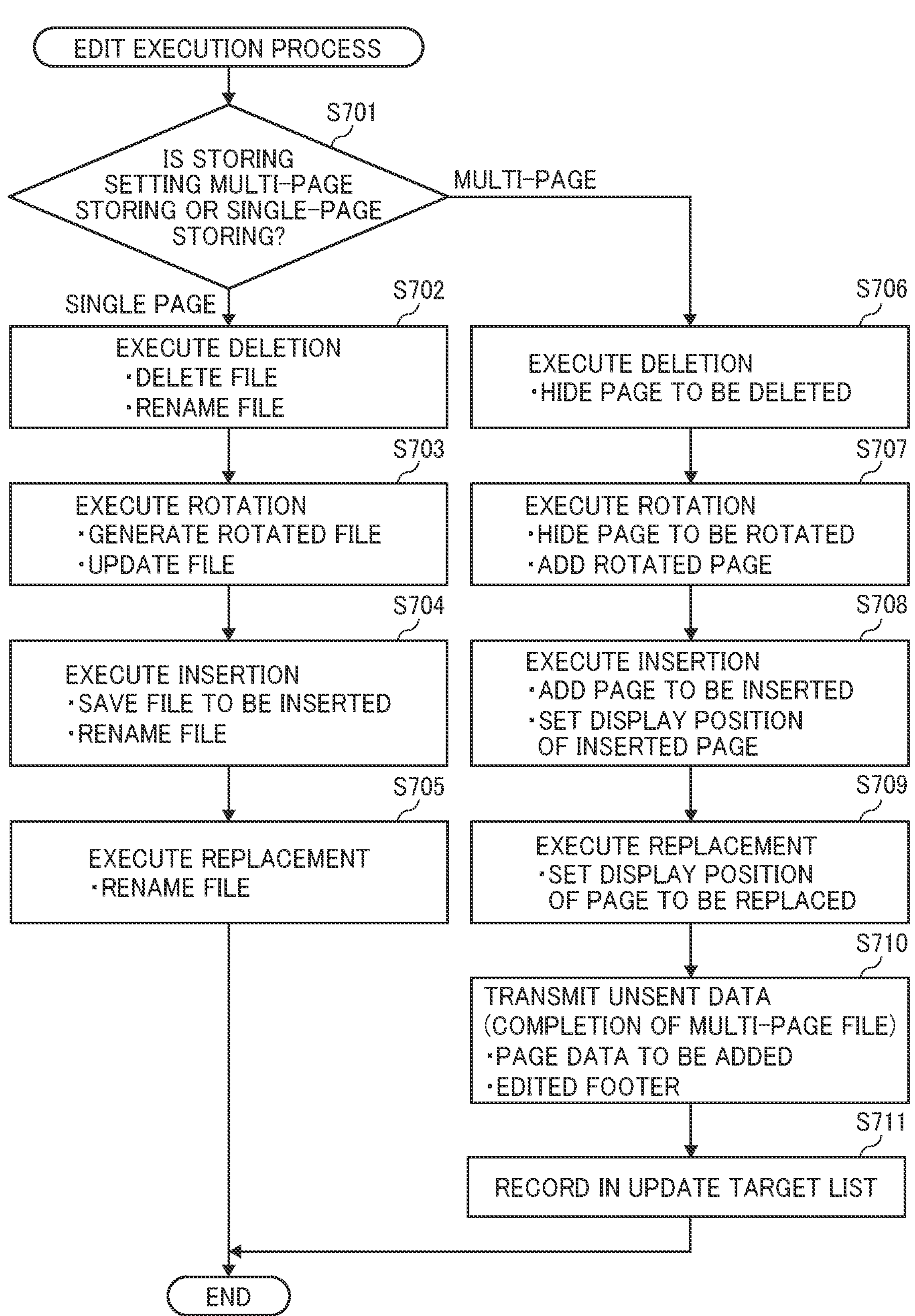
FIG. 12 is a flowchart of a process of execution of edit according to an embodiment of the present disclosure.

FIG. 12 is a flowchart of a process of execution of edit according to the present embodiment.

The process illustrated in the flowchart of FIG. 12 corresponds to step S209 of the document editing process described with reference to FIG. 6.

In step S701, the storing setting is checked. The data manipulation unit 22 refers to the setting data of the scanner 1 and checks whether the storing setting is the multi-page storing or the single-page storing. When the storing setting is the multi-page storing, the process proceeds to step S706. By contrast, when the storing setting is the single-page storing, the process proceeds to step S702.

Steps S702 to S705 indicate the respective contents of the editing executed corresponding to the preparatory processes for deletion, rotation, insertion, and replacement when the storing setting is the single-page storing. Note that, although these processes are in the order of deletion, rotation, insertion, and replacement for convenience of description, the actual order is not limited to this order.

In step S702, page deletion for the single-page file is executed. When the preparatory process for deletion has been performed in the single-page storing (when the single-page file deletion flag is set), the data manipulation unit 22 identifies the folder path to the folder storing the file corresponding to the page in the external storage 9 by referring to the correspondence data. The data manipulation unit 22 generates, by designating the folder path, a command (edit data including a command to delete a file) to delete a file stored of the external storage 9 and edit data including the rename command for the files corresponding to the pages subsequent to the page to be deleted in the target document, stored in external storage 9. The data manipulation unit 22 transmits the generated command and edit data to the external storage 9, to cause the external storage 9 to execute the processing corresponding to the edit instruction, i.e., delete the target page data (file).

The data manipulation unit 22 performs renaming for consistency when the file name includes a serial number. For example, for a 10-page document having a file name in the format of "(document name)_(page number)," files having file names of "(document name)_001.pdf" to "(document name)_010.pdf" are stored in the external storage 9. When the third page is to be deleted, after "(document name)_003.pdf" is deleted, the files from "(document name)_004.pdf" to "(document name)_010.pdf" are to be renamed to "(document name)_003.pdf" to "(document name)_009.pdf." Accordingly, the external storage 9 performs renaming like dominos while adjusting the renaming order to prevent the file names from overlapping in the renaming.

In step S703, page rotation for the single-page file is executed. When the preparatory process for rotation has been performed in the single-page storing, initially, the data manipulation unit 22 identifies the folder path to the folder storing the file corresponding to the page in the external storage 9 by referring to the correspondence data, and obtains the file from the external storage 9 by designating the folder path. The data manipulation unit 22 then performs the editing to rotate, to a desired angle, the page included in the file corresponding to the page specified by the obtained rotation instruction. To rotate the page, the page data may be converted to generate new page data. Alternatively, in the case of an image format such as Joint Photographic Experts Group (JPEG) in which the rotation angle can be designated by metadata, metadata such as a rotation tag may be given to the file. After the page is rotated, the data manipulation unit 22 transmits, to the external storage 9, the edit data (the edited file and a file update command) including the edit result (the edited file including the rotated page data). By so doing, the data manipulation unit 22 causes the external storage 9 to execute the processing corresponding to the edit instruction, to update the file before the edit of the target page to the edited file in the external storage 9.

In step S704, page insertion for the single-page file is executed. When the preparatory process for insertion has been performed in the single-page storing, the data manipulation unit 22 causes the external storage 9 to store the page data of the inserted page, and generates edit data including a rename command. The rename command is for renaming the file(s) of at least one of multiple pages and the inserted page so that the inserted page is displayed before or after the page. By transmitting such edit data, the data manipulation unit 22 causes the external storage 9 to execute the processing corresponding to the edit instruction.

To be more specific, the data manipulation unit 22 transmits, to the external storage 9, the file including the page data of the inserted page with a temporary file name and causes the external storage 9 to store the file. The temporary file name is the file name given the page number "11" in the example described in step S504. The data manipulation unit 22 then performs renaming for consistency when the file name includes a serial number.

For example, in the case of the file name format of "(document name)_(page number)," at the time 10 pages have been read, files having file names "(document name)_001.pdf" to "(document name)_010.pdf" are stored in the external storage 9. The file name of the inserted page is "(document name)_011.pdf." When the page is to be inserted as the fifth page, the files stored with the file names "(document name)_005.pdf" to "(document name)_010.pdf" are to be renamed to "(document name)_006.pdf" to "(document name)_011.pdf," and the file of the inserted page is to be renamed to "(document name)_005.pdf. Accordingly, the external storage 9 performs renaming like dominos while adjusting the renaming order to prevent the file names from overlapping in the renaming.

As described above, in the page deletion and the page insertion in the single-page storing, files other than the file subject to the deletion or the insertion are also renamed. The scanner 1 (i.e., the own information processing apparatus including the data manipulation unit 22) may perform by itself the renaming process (specifically, the generation of the edit data including the rename command and transmission of the edit data to the external storage 9). However, when the number of files to be renamed is larger than a predetermined number (for example, 100 or more files), the scanner 1 may perform the renaming process in cooperation with one or more information processing apparatuses (which may be scanners of the same type as the scanner 1 or different information processing apparatuses) on the same network.

It is preferable to use, for the cooperation, one or more information processing apparatuses connected to the network and being on standby (being idle and not performing an operation such as scanning instructed by a user). The scanner 1 transmits a request for cooperation to one or more information processing apparatuses on standby on the same network. When the information processing apparatuses accept the request for cooperation, the scanner 1 transmits a request for renaming process to the information processing apparatuses accepting the request. When the request for renaming process completes, each information processing apparatus that has accepted the request accesses the external storage 9 for the rename process of the requested portion, and performs the rename process. In other words, the data manipulation unit 22 may cause another information processing apparatus to transmit the edit data including at least a part of the rename command to cause the external storage 9 to execute the process corresponding to the rename command, instead of the own information processing apparatus (the scanner 1). For example, when the added page is to be inserted as the 50th page, the operation may be shared such that the own information processing apparatus performs the renaming process of the 50th page to the 79th page and one or more other information processing apparatuses performs the renaming process of the 80th page to the 101st page.

In step S705, page replacement for the single-page file is executed. When the preparatory process for replacement has been performed in the single-page storing, the data manipulation unit 22 generates edit data including a rename command for the files corresponding to two pages stored in the external storage 9. The rename command is for displaying the two pages in a replaced manner. By transmitting such edit data, the data manipulation unit 22 causes the external storage 9 to execute the processing corresponding to the edit instruction.

More specifically, the data manipulation unit 22 performs the renaming process to replace the file names of the files to be replaced. For example, when the file names of the files to be replaced are "(document name)_006.pdf" and "(document name)_013.pdf," the rename command for replacing these files to be renamed with the file names of "(document name)_013.pdf" and "(document name)_006.pdf" is transmitted to the external storage 9. According to this rename command, the transmitted files stored in the external storage 9 are replaced.

Steps S706 to S709 indicate the respective contents of the editing executed corresponding to the preparatory processes for deletion, rotation, insertion, and replacement when the storing setting is the multi-page storing. Note that, although these processes are in the order of deletion, rotation, insertion, and replacement for convenience of description, the actual order is not limited to this order.

In step S706, page deletion for the multi-page file is executed. When the preparatory process for deletion has been performed in the multi-page storing, the data manipulation unit 22 transmits, to the external storage 9, the edit data including the page display information of the multi-page file, indicating that the deletion target page is hidden. By so doing, the data manipulation unit 22 causes the external storage 9 to execute the processing corresponding to the edit instruction. The edit data including the page display information mentioned here is a footer of the multi-page file including display-related information. At the time of this processing the header and the read page data of the multi-page file have been transmitted to the external storage 9, but the footer of the multi-page file remains unsent. The external storage 9 is waiting for the reception of the subsequent the data of the multi-page file from the scanner 1. Accordingly, the data manipulation unit 22 can add a display-related instruction to the footer.

Specifically, when the multi-page file deletion flag is set, the data manipulation unit 22 adds an instruction for hiding the deletion target page to the footer (unsent) of the multi-page file by using the structure of the multi-page file (a PDF file in the present embodiment). This instruction allows a computer that is to display the document related to the file to handle the deletion target page, which is included as data in the file, as a hidden page (to exclude the deletion target page from the pages to be displayed). More specifically, the data manipulation unit 22 deletes the page information of the deletion target page not to be displayed, from the page display objects, included in the footer of the multi-page file.

In step S707, page rotation for the multi-page file is executed. When the preparatory process for rotation has been performed in the multi-page storing, the data manipulation unit 22 transmits, to the external storage 9, edit data including page display information of the multi-page file, indicating that the rotation target page to be displayed at the designated angle. By so doing, the data manipulation unit 22 causes the external storage 9 to execute the processing corresponding to the edit instruction. The edit data including the page display information mentioned here is copy data to be described later and/or the unsent footer including display-related information of the multi-page file. The data manipulation unit 22 can add a display-related instruction to the unsent footer.

Specifically, the data manipulation unit 22 generates copy page data of the rotation target page stored in the external storage 9. The copy page data is the page data of the same page as the rotation target page.

At this time, when the page data of the rotation target page has been deleted from the internal storage unit 21 of the scanner 1, the data manipulation unit 22 obtains the page data of the rotation target page from the external storage 9, designating the file path obtained from the correspondence data.

The data manipulation unit 22 then adds instructions to the unsent footer of the multi-page file (a PDF file in the present embodiment). The instructions added include an instruction for hiding the rotation target page stored in the external storage 9 and an instruction (such as display page position information and rotation tag) to display, at the designated angle, the copy page data to be additionally transmitted to the external storage 9, instead of the stored rotation target page.

The above description concerns the method of rotating the display of a desired page by a combination of copy page data and a rotation instruction, but the rotation display may be achieved by other methods. To rotate the display of a desired page, for example, the data manipulation unit 22 may rotate, by a designated angle, copy page data of (page data of the same page as) the rotation target page stored in the external storage 9, to obtain page data of a rotated page. Then, the data manipulation unit 22 transmits, to the external storage 9, edit data including the page data of the rotated page and a footer (page display information) including an instruction for displaying the rotated page instead of the rotation target page.

In step S708, page insertion for the multi-page file is executed. When the preparatory process for insertion has been performed in the multi-page storing, the data manipulation unit 22 transmits, to the external storage 9, edit data including the page display information of the file, indicating that the inserted page is displayed at the designated position, and the page data of the inserted page. By so doing, the data manipulation unit 22 causes the external storage 9 to execute the processing corresponding to the edit instruction.

More specifically, the data manipulation unit 22 adds, to the unsent footer of the multi-page file (a PDF file in the present embodiment), an instruction (display page position information) for displaying the inserted page to be additionally transmitted to the external storage 9 at the designated position. At this time, since the page numbers of pages subsequent to the inserted page are shifted, an instruction concerning these pages having the shifted page numbers is also added.

In step S709, page replacement for the multi-page file is executed. When the preparatory process for replacement has been performed in the multi-page storing, the data manipulation unit 22 transmits, to the external storage 9, edit data including page display information of the multi-page file, indicating that two pages are to be displayed in the replaced manner. By so doing, the data manipulation unit 22 causes the external storage 9 to execute the processing corresponding to the edit instruction.

More specifically, the data manipulation unit 22 adds, to the unsent footer of the multi-page file (a PDF file in the present embodiment), an instruction (display page position information) for displaying the replacement target pages at the replaced positions.

In steps S710 and S711, the unsent data is transmitted, and the multi-page file completes. When the operation on the footer completes in the process from step S706 to step S709, the data manipulation unit 22 transmits the unsent data including the footer remaining in the internal storage unit 21 of the scanner 1 to the external storage 9 so that the external storage 9 stores the entire file (step S710). In other words, in the external storage 9, the multi-page file completes at the time when the unsent data including the footer is received.

The unsent data transmitted here in addition to the footer includes the copy page data of the rotation target page (if any) and/or the page data of the inserted page (if any). As a result of the transmission the unsent data and footer to complete the multi-page file in this way, when a page rotation instruction has been received, a computer that is to display the document of the file is instructed to hide the rotation target page included as data in the file and display, at the designated rotation angle, the copy page data added at the end of the stored file, instead of the hidden rotation target page. Further, when a page insertion instruction has been received, the computer that is to display the document of the file is instructed to display, at the designated insertion position, the page data of the insertion target page added at the end of the stored file. Further, when a page replacement instruction has been received, the computer that is to display the document of the file to display the page data of the replacement target pages at the replaced positions.

Further, when the pages of the multi-page file are deleted and/or rotated in the process from step S706 to step S710, the data manipulation unit 22 records the file including deleted and/or rotated pages in the update target list so that the file is to be processed in a file update process described later (step S711). Then, the process illustrated in the flowchart of FIG. 12 ends.

Figure 13:
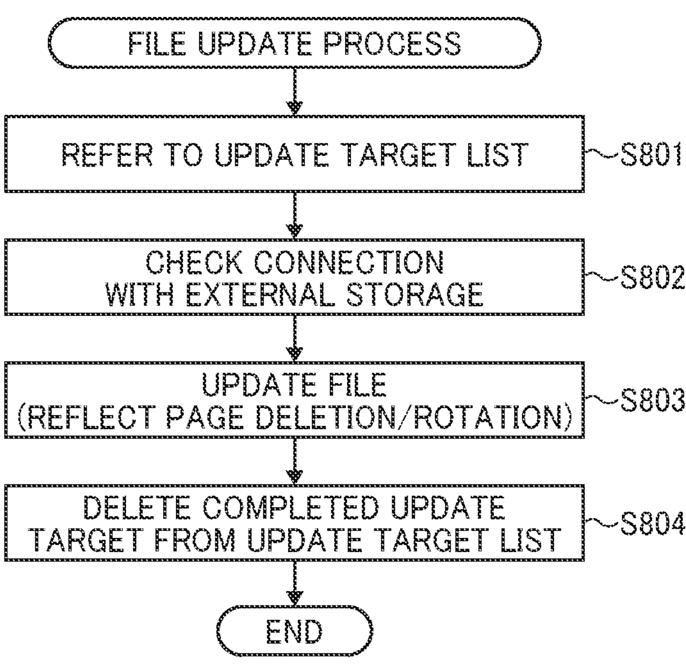
FIG. 13 is a flowchart of a file update process according to an embodiment of the present disclosure.

FIG. 13 is a flowchart of a file update process according to the present embodiment. The process in the flowchart of FIG. 13 is executed periodically at a preset time under the conditions that the scanner 1 is connected to the network and on standby (being idle and not performing an operation such as scanning instructed by a user). The time of execution can be set to, for example, 4:00 a.m. daily. Further, the process illustrated in the flowchart of FIG. 13 may be executed on condition that an automatic deletion function for deleting hidden data of a multi-page file in which a part of pages is hidden is valid.

In steps S801 and S802, the update target list is referred to, and the connection with the external storage 9 is checked. The data manipulation unit 22 refers to the update target list stored in the scanner 1 or the external storage 9, to determine whether the transmitted multi-page files include a file to be updated (step S801). In the update target list, of the multi-page files that have been transmitted to the external storage 9, files subjected to the file update process in the flowchart of FIG. 13 are recorded. If the update target list includes a file to be updated and the file is allowed to be edited by the scanner 1, the data manipulation unit 22 checks whether the scanner 1 is connected to the external storage 9 (step S802). The process then proceeds to step S803.

In step S803, the file is updated to reflect the display content (deletion and/or rotation of the page) controlled by the setting in the footer in the actual page data. When confirming that the data manipulation unit 22 can communicate with the external storage 9, the data manipulation unit 22 requests the external storage 9 to delete the page data corresponding to the page hidden to be deleted, from the file. The data manipulation unit 22 further requests the external storage 9 to replace the rotation target page with the added page and then delete the page data corresponding to the rotation target page.

Specifically, the data manipulation unit 22 obtains the multi-page data stored in the external storage 9 based on the update target list. In the file update process for page deletion, the data manipulation unit 22 deletes the page data set to be hidden in the obtained multi-page file, thereby updating the multi-page file.

In the file update process for page rotation, the data manipulation unit 22 edits the page information in the obtained multi-page file so as to replace the display positions (page numbers) of the rotation target page set to be hidden and thus is not actually displayed and the copy page added to the end of the file to be used for the actual display of the rotated page, and deletes, from the file, the page data of the rotation target page set to be hidden. For example, when the third page is to be rotated and a rotated copy of the third page to be rotated is added to the end of the file, the display positions of the third page and the end page are replaced, and the page data of the third page is deleted.

Then, the data manipulation unit 22 transmits the updated multi-page file to the external storage 9, and replaces the previous multi-page file with the updated multi-page file, thereby updating the multi-page file in the external storage 9. This updating enables the deletion, from the file, of the data of the page hidden by the setting in the footer but whose data remains in the file. Note that, the multi-page file in the external storage 9 may be updated by storing the updated file as a temporary file and then deleting the previous file, or by overwriting the previous file with the updated file. The process then proceeds to step S804.

In step S804, the update target list is updated. When the update of the update target files completes, the data manipulation unit 22 deletes the updated files from the update target list. Then, the process illustrated in the flowchart of FIG. 13 ends.

The file update process described with reference to FIG. 13 can be executed by an information processing apparatus other than the scanner 1 that has transmitted the multi-page file to be updated to the external storage 9. In other words, the data manipulation unit 22 of the scanner 1 can cause, instead of the own information processing apparatus (the scanner 1), another information processing apparatus to perform at least a part of the process of requesting the external storage 9 to delete the page data, which is executed at a predetermined timing.

More specifically, the other information processing apparatus may be a scanner of the same type as the scanner 1 or an information processing apparatus of a different type. On condition that the other information processing apparatus connected to the same external storage 9 is on standby at the designated time and can access the external storage 9, the other information processing apparatus can search for the multi-page file stored in the external storage 9 by the scanner 1 or the scanner of the same type, and can delete unnecessary data from the multi-page file or edit the multi-page file if the retrieved multi-page file includes hidden data or edit flag data.

This configuration is advantageous in a case where the scanner 1 having stored a file in the external storage 9 cannot execute the file update process because, for example, the scanner 1 is turned off or used by a user (not on standby). Even in such a case, another information processing apparatus can refer to job information and, if the job transmission destination has an update target list, delete hidden page data from the target multi-page file based on the update target list. The file update process executed by another information processing apparatus is similar to the file update process described with reference to FIG. 13, and thus the description thereof is omitted.

The present disclosure can be embodied as an information processing apparatus, a system, a method executed by a computer, or a program executed by a computer. Further, the present disclosure can also be embodied as a machine-readable recording medium that stores such a program in a format to be read by computers, other apparatuses, or machines. The machine-readable recording medium refers to a recording medium that stores information such as data and programs electrically, magnetically, optically, mechanically, or by chemical action to be read by, for example, a computer.

As described above, the techniques of the present disclosure can increase the opportunities for a user to edit a read document.

For example, the system according to any one of the embodiments of the present disclosure allows the user to designate a page to be edited from the thumbnails of pages displayed based on the pages of the document that are read, and receive user instructions for editing such as deletion or rotation of the page to be edited. Thus, the system according to any one of the embodiments saves the user's time and effort for editing and increase the efficiency of document management. Furthermore, since workability of the page editing work increases, the system allows the user to easily start reading, and the recovery from an error such as detection of the mixing of an unnecessary page becomes easy. As a result, the user is less annoyed during the reading operation, and the user experience is improved.

Furthermore, the above-described techniques enable various editing operations on the thumbnails displayed after reading and obviate the necessity to complete the editing before storing the file. As a result, the speed of reading by the scanner increases. Further, the speed of renaming can be increased by the cooperation with another information processing apparatus.

In the above-described embodiments, the technology according to the present disclosure is adopted in the scanner 1 in which the storing setting is selectable from the single-page storing and the multi-page storing. However, the information processing apparatus to which the technologies according to the present disclosure is applicable is not limited to an apparatus in which the storing setting is selectable from the single-page storing and the multi-page storing. The technologies according to the present disclosure are applicable to both an information processing apparatus adopting only the single-page storing and an information processing apparatus adopting only the multi-page storing.

In the above-described embodiments, the cooperation with the external storage such as a cloud server, a file server, or an online storage is performed using file sharing or a network protocol such as a file transfer protocol (FTP). However, the type of external storage and the type of protocol used for the cooperation with the external storage are not limited to the examples described above. Examples of the external storage include a universal serial bus (USB) memory connected via a peripheral device interface such as a USB interface, an external drive, and the storage device 14 of the scanner 1 itself.

In the above-described embodiments, the edit screen including the thumbnails is displayed on the touch panel display of the scanner 1, and the user operation is received via the touch panel display. However, the display of the edit screen and the reception of the user operation may be performed by other means. For example, an edit screen including thumbnails may be displayed on a display of a computer connected to a scanner as the reading unit via an application that operates on the computer and controls the scanner, and a user operation may be received via an input device of the computer.

The present disclosure also includes the following aspects.

In Aspect 1, an information processing apparatus connected to a reading unit that reads a document having multiple pages includes a data manipulation unit. When page data of a document having multiple pages is stored as one file per document in an external storage, the data manipulation unit requests, at a predetermined timing, the external storage to delete page data corresponding to a page hidden to be deleted, from the file.

In Aspect 2, the data manipulation unit transmits, to the external storage, edit data including page data of a page that is the same as a page to be rotated and page display information. The page display information indicates that the same page is to be displayed at a designated angle, instead of the page to be rotated.

In Aspect 3, the data manipulation unit transmits, to the external storage, the edit data including page data of a rotated page and the page display information indicating that the rotated page is to be displayed instead of the page to be rotated. The rotated page is obtained by rotating, the designated angle, the same page as the page to be rotated.

In Aspect 4, the data manipulation unit requests, at a predetermined timing, the external storage to replace the page to be rotated with an added page and delete the page data corresponding to the page to be rotated.

In Aspect 5, in the information processing apparatus of Aspect 1, the data manipulation unit causes another information processing apparatus to perform at least a part of a process of requesting the external storage to delete the page data, instead of the information processing apparatus. The process of requesting is to be executed at the predetermined timing.

In Aspect 6, in the information processing apparatus of Aspect 4, the data manipulation unit causes another information processing apparatus to perform at least a part of a process of requesting the external storage to delete the page data, instead of the information processing apparatus. The process of requesting is to be executed at the predetermined timing.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image reading apparatus comprising circuitry configured to:

receive, from a reading unit that reads a document having multiple pages, multiple page data individually corresponding to the multiple pages of the document;

start transmitting, to an external storage that is external to the image reading apparatus, the multiple page data to be stored in the external storage before the reading unit completes reading all pages of the document;

display, on a display, thumbnails of the multiple pages included in the document;

receive a user operation, on one or more of the thumbnails corresponding to the page data to be edited, as an edit instruction for editing page data that has already been transmitted to and stored in the external storage among the multiple page data; and transmit, to the external storage, an edit data command that causes the external storage to modify the already-stored page data according to the edit instruction such that a content displayed based on the multiple page data reflects the modification made by the external storage, wherein the external storage retains the multiple page data reflecting the contents of the edit instruction without automatically transferring the multiple page data to other storage or automatically deleting the multiple page data, wherein the multiple page data relating to a document is stored in the external storage as one file per document, and wherein the edit data is transmitted as a footer of the one file.

2. The image reading apparatus according to claim 1, further comprising an internal memory that stores the multiple page data corresponding to the multiple pages read by the reading unit, wherein the circuitry is further configured to:

delete the page data having been transmitted to the external storage from the internal memory before reading all pages of the document completes; and receive the edit instruction for editing the page data having been transmitted to the external storage irrespective of whether the page data affected by the edit instruction is deleted from the internal memory.

3. The image reading apparatus according to claim 1, wherein the circuitry is further configured to:

display, on a display, thumbnails of the multiple pages included in the document;

and receive, as the edit instruction for editing the page data, a user operation on one or more of the thumbnails corresponding to the page data to be edited.

4. The image reading apparatus according to claim 1, wherein the multiple page data of the document is stored in the external storage as one file per page or as one file per document, wherein the circuitry is further configured to:

store, in a memory, correspondence data indicating correspondence between the page data or the document transmitted to the external storage and the file of the page data or the file of the document stored in the external storage; and designate the file to be edited based on the correspondence data.

5. The image reading apparatus according to claim 1, wherein the circuitry is configured to determine the edit data for reflecting the edit instruction on the content based on whether the multiple page data of the document is stored in the external storage as one file per page or as one file per document.

6. The image reading apparatus according to claim 1, wherein the edit data transmitted to the external storage includes identification information of a page affected by the edit instruction, among the multiple pages of the document.

7. The image reading apparatus according to claim 1, wherein, when the multiple page data of the document are stored as one file per page in the external storage, the circuitry is configured to transmit the edit data including information identifying the file of a page affected by the edit instruction, among the multiple pages of the document.

8. The image reading apparatus according to claim 7, wherein, when the edit instruction instructs deletion of a page, the edit data includes a deletion instruction for deleting the file of the page and a renaming instruction for renaming one or more files each of which corresponds to a page of the document other than the page to be deleted.

9. The image reading apparatus according to claim 8, wherein the circuitry is configured to cause another image reading apparatus to transmit edit data including at least a part of the renaming instruction instead of the image reading apparatus, so as to cause the external storage to execute the processing corresponding to the renaming instruction.

10. The image reading apparatus according to claim 7, wherein, when the edit instruction instructs rotation of a page, the circuitry is configured to rotate the page data included in the file of the page affected by the edit instruction by a designated angle, and the edit data transmitted to the external storage includes a result of the rotating.

11. The image reading apparatus according to claim 7, wherein, when the edit instruction instructs insertion of a supplemental page read by the reading unit before or after a particular page of the multiple pages of the document, the circuitry is configured to cause the external storage to store page data of the supplemental page as a file, and the edit data transmitted to the external storage includes a renaming instruction for renaming at least one of the file of the supplemental page or one or more files corresponding to the multiple pages of the document other than the supplemental page, such that the supplemental page is displayed before or after the particular page of the multiple pages.

12. The image reading apparatus according to claim 7, wherein, when the edit instruction instructs replacing of two pages of the document with each other, the edit data transmitted to the external storage includes a renaming instruction for renaming the files of the two pages stored in the external storage, such that the two pages are displayed in a replaced order.

13. The image reading apparatus according to claim 1, wherein, when the multiple page data of the document are stored as one file per document in the external storage, the circuitry is configured to transmit the edit data including information identifying a page affected by the edit instruction and the file including the page affected by the edit instruction.

14. The image reading apparatus according to claim 13, wherein, when the multiple page data of the document are stored as one file per document in the external storage, the edit data transmitted to the external storage includes page display information of the file, the page display information being generated according to the edit instruction.

15. The image reading apparatus according to claim 14, wherein, when the edit instruction instructs deletion of a page, the edit data transmitted to the external storage includes page display information of the file, the page display information indicating to hide the page to be deleted.

16. The image reading apparatus according to claim 14, wherein, when the edit instruction instructs rotation of a page, the edit data transmitted to the external storage includes page display information indicating that the page is to be displayed in a manner rotated by a designated angle.

17. The image reading apparatus according to claim 14, wherein, when the edit instruction instructs insertion of a supplemental page read by the reading unit at a designated position of the document, the edit data transmitted to the external storage includes:

page display information of the file, the page display information indicating that the supplemental page is to be displayed at the designated position; and page data of the supplemental page.

18. The image reading apparatus according to claim 14, wherein, when the edit instruction instructs replacing of two pages of the document with each other, the edit data transmitted to the external storage includes page display information of the file, the page display information indicating that the two pages are to be displayed in a replaced order.

19. An image reading method comprising:

receiving, with an image reading apparatus, from a reading unit that reads a document having multiple pages, multiple page data individually corresponding to the multiple pages of the document;

starting transmitting, to an external storage that is external to the image reading apparatus, the multiple page data to be stored in the external storage before the reading unit completes reading all pages of the document;

displaying, on a display, thumbnails of the multiple pages included in the document;

receiving a user operation, on one or more of the thumbnails corresponding to the page data to be edited, as an edit instruction for editing page data that has already been transmitted to and stored in the external storage among the multiple page data; and transmitting, to the external storage, an edit data command that causes the external storage to modify the already-stored page data according to the edit instruction such that a content displayed based on the multiple page data reflects the modification made by the external storage, wherein the external storage retains the multiple page data reflecting the contents of the edit instruction without automatically transferring the multiple page data to other storage or automatically deleting the multiple page data, wherein the multiple page data relating to a document is stored in the external storage as one file per document, and wherein the edit data is transmitted as a footer of the one file.

20. A non-transitory recording medium storing a plurality of program codes which, when executed by a computer of an image reading apparatus, causes the computer to perform a method, the method comprising:

receiving, with an image reading apparatus, from a reading unit that reads a document having multiple pages, multiple page data individually corresponding to the multiple pages of the document;

starting transmitting, to an external storage that is external to the image reading apparatus, the multiple page data to be stored in the external storage before the reading unit completes reading all pages of the document;

displaying, on a display, thumbnails of the multiple pages included in the document;

receiving a user operation, on one or more of the thumbnails corresponding to the page data to be edited, as an edit instruction for editing page data that has already been transmitted to and stored in the external storage among the multiple page data; and transmitting, to the external storage, an edit data command that causes the external storage to modify the already-stored page data according to the edit instruction such that a content displayed based on the multiple page data reflects the modification made by the external storage, wherein the external storage retains the multiple page data reflecting the contents of the edit instruction without automatically transferring the multiple page data to other storage or automatically deleting the multiple page data, wherein the multiple page data relating to a document is stored in the external storage as one file per document, and wherein the edit data is transmitted as a footer of the one file.

* * * * *